March 25, 1941.  W. A. STETZ  2,236,455
SIGNAL FOR BICYCLES
Filed June 3, 1940  2 Sheets-Sheet 1
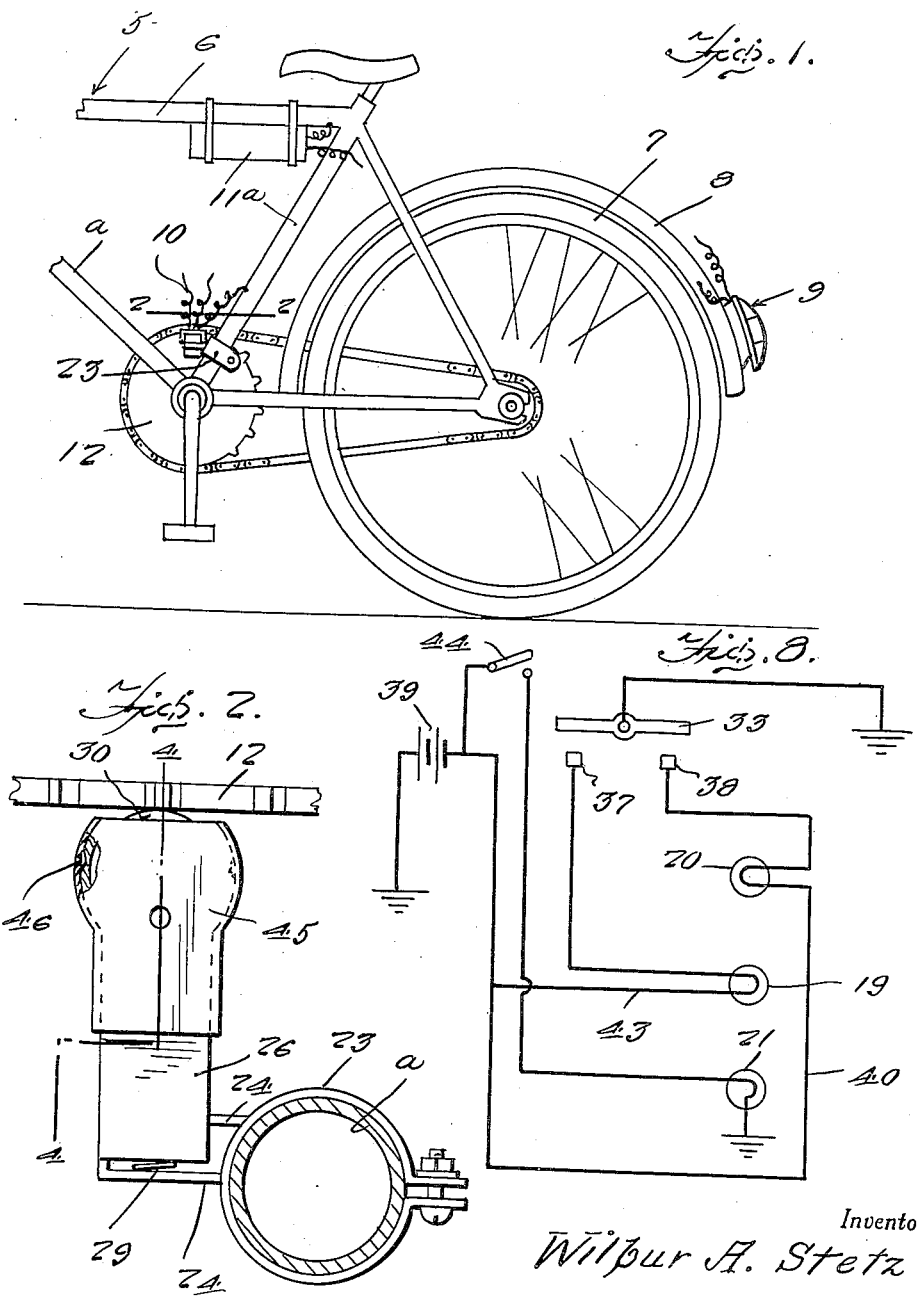
Inventor
Wilbur A. Stetz
By Clarence A. O'Brien
Attorney March 25, 1941.   W. A. STETZ   2,236,455
SIGNAL FOR BICYCLES
Filed June 3, 1940   2 Sheets-Sheet 2
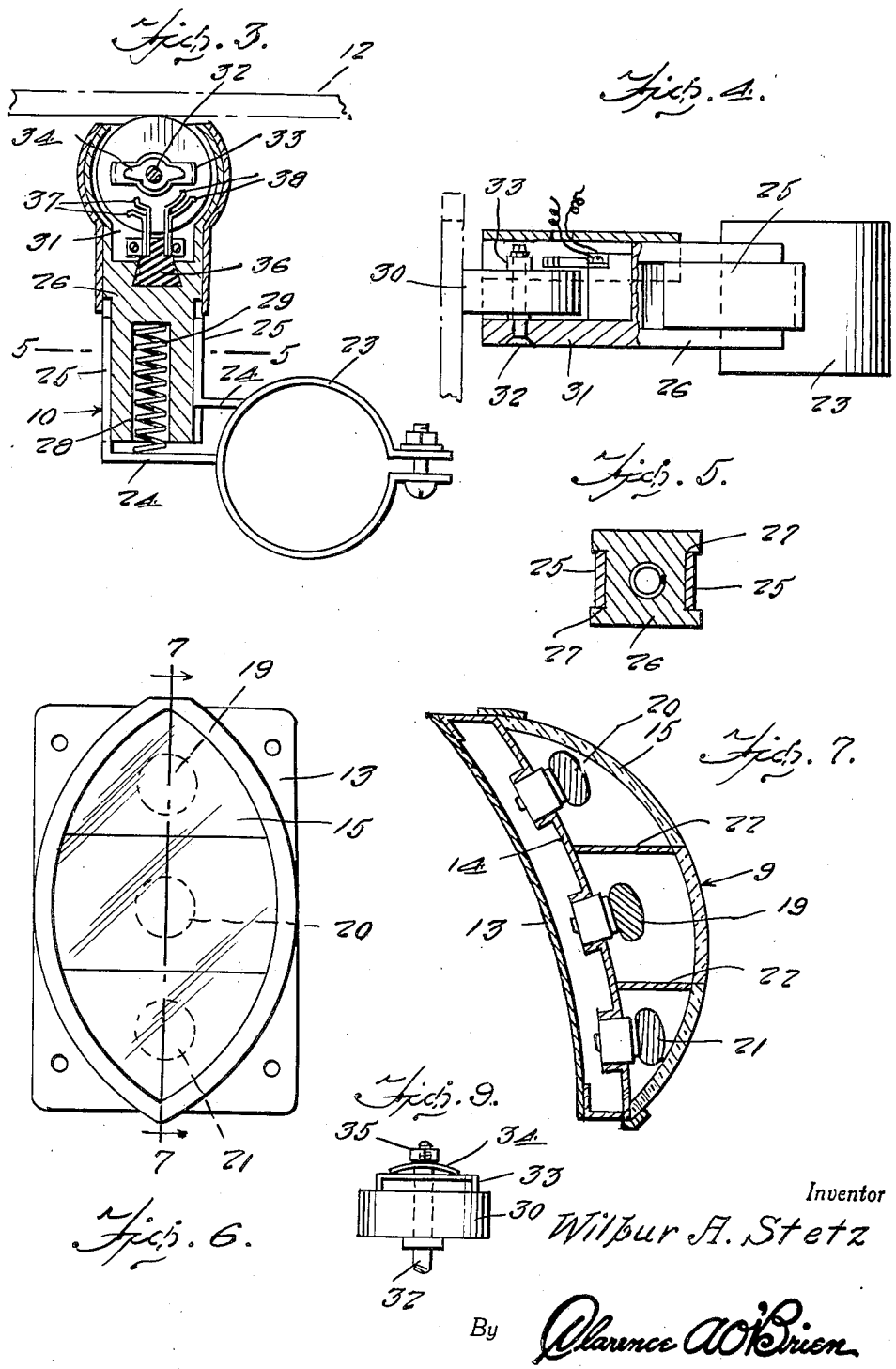
Inventor
Wilbur A. Stetz
By Clarence A. O'Brien
Attorney Patented Mar. 25, 1941

2,236,455

UNITED STATES PATENT OFFICE 2,236,455

SIGNAL FOR BICYCLES

Wilbur A. Stetz, Fullerton, Pa.

Application June 3, 1940, Serial No. 338,606

1 Claim. (Cl. 200—52)

This invention appertains to new and useful improvements in traffic signals for bicycles.

The principal object of the present invention is to provide a signal which will indicate automatically to pedestrians and trailing motorists that the cyclist intends to stop.

Another important object of the invention is to provide signal means for bicycles whereby signals will automatically be rendered indicating that the cyclist intends to "go" or "stop."

Other objects and advantages of the invention will become apparent to the reader of the following specification.

In the drawings:

Figure 1 represents a fragmentary side elevational view of a bicycle showing the invention installed.

Figure 2 is an enlarged sectional view taken substantially on the line 2—2 of Figure 1.

Figure 3 is a substantially horizontal sectional view through the switch means taken on line 4—4 of Figure 2.

Figure 4 is a side elevational view of the switch means with a portion broken away.

Figure 5 is a section on the line 5—5 of Figure 3.

Figure 6 is a face elevational view of the signal box.

Figure 7 is a section taken substantially on the line 7—7 of Figure 6.

Figure 8 is a diagrammatic view disclosing the electrical connection between the electrical devices involved.

Figure 9 is a side elevational view of the roller.

Referring to the drawings wherein like numerals designate like parts, it can be seen that numeral 5 generally refers to a bicycle of which the frame is denoted by the numeral 6. Numeral 7 denotes the rear wheel over which is disposed the guard 8 to which can be attached the signal box generally referred to by numeral 9. The sprocket wheel controlled switch forming part of the present invention and adapted for controlling the light of the signal box 9 is generally referred to by numeral 10 and the source of current, preferably in the form of a battery 11 is carried by the horizontal bar of the frame 6. The sprocket drive wheel 12 is adapted for operating the switch means 10.

The signal box 9 consists of an arcuate-shaped box structure 13 adapted to conform with the curvature of the guard 8. A partition 14 is located in this box structure and over this is disposed the ovate-shaped dome-like translucent and sectional front wall 15 which may be of different colors to accommodate the upper "stop" light bulb 19, the "go" light bulb 20 and the tail light bulb 21. Partitions 22 are interposed between the partition 14 and the front wall to divide the space between the partition 14 and the front wall into separate lamp compartments.

The switch 10 consists of a clamp 23 adapted to be clamped to the rear leg of the V-forming members a—a of the frame 6. This clamp 23 has a pair of laterally disposed members 24—24 from which laterally disposed and parallel spaced arms 25—25 extend. A block 26 of elongated construction has channelways 27 in a pair of opposite sides thereof for receiving the legs 25—25. Thus the block is slidably disposed between the arms 25—25. The block 26 has a bore 28 extending into itself from one end thereof and disposed into this bore is a compression spring 29 which has one end impinging against the inner end of the bore 28 and its other end against one of the laterally disposed members 24. Thus spring force is afforded for maintaining the switch 10 urged in the direction against the sprocket wheel 12, that is, with the contact roller 30 engaged with said sprocket wheel.

The block 26 has an extending base portion 31 upwardly from the free end portion of which projects a pin 32 on which the roller 30 is mounted and with which the roller is adapted to rotate. A substantially inverted U-shaped contactor is secured to the pin 32 above the roller 30 and is held with its leg portions 33 pressing against the roller 30 by an arcuate strip spring 34 backed by a nut 35 on a threaded upper portion of the pin 32.

A block 36 of insulation is dovetailed into the outer end portion of the block 26 and carries a pair of contact fingers 37 on one side, connected to stop lamp 19, and a second pair of spring contact fingers 38 connected to the go lamp 20.

As before stated, the spring 28 forces the roller 30 against the wheel 12. Normally when the ratchet wheel 12 is turning in a direction driving the bicycle forwardly, the roller 30 will be rotated to a position where the contactor will be engaging the contact fingers 38 and current will be passing from the battery or some other source 39 by way of the conductor 40, lamp 20, contact 38, contactor 33, to ground, thus indicating "go."

When the cyclist is about to stop, there is always a slight rearward or reverse rotation of the sprocket wheel 12 which reverses the rotation of the roller 30 and causes the contactor 33 to engage the contact fingers 37 and result in the passage of current by way of the conductor 43, lamp 19, contact 37, contactor 33 to ground, thus illuminating the box at the stop light 19.

The tail lamp 21 is controlled by the manual switch 44.

A split casing 45 is disposed over extending portions of the block 26 and has inwardly disposed protuberances which match in the recesses in the leg portions of the block 26. Thus the housing is provided for the movable elements of the switch.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A switch structure of the character described comprising a roller, a contactor carried by the roller, a pair of contacts stationarily mounted adjacent the contactor, a slidable structure carrying the said roller and a protective shell for the roller, contacts and contactor for supplying means for normally urging the roller, a slide block of insulation on the slidable structure, said slidable block of insulation being dovetailed to the slidable structure and carrying the said contacts.

WILBUR A. STETZ.